United States Patent
Higuchi et al.

(10) Patent No.: US 10,428,889 B2
(45) Date of Patent: Oct. 1, 2019

(54) TORSION SPRING

(71) Applicant: DENSO CORPORATION, Kariya, Aichi-pref. (JP)

(72) Inventors: Akira Higuchi, Kariya (JP); Tohru Shimizu, Kariya (JP); Tadashi Komiyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/752,319

(22) PCT Filed: Sep. 19, 2016

(86) PCT No.: PCT/JP2016/077606
§ 371 (c)(1),
(2) Date: Feb. 13, 2018

(87) PCT Pub. No.: WO2017/057080
PCT Pub. Date: Apr. 6, 2017

(65) Prior Publication Data
US 2018/0238409 A1   Aug. 23, 2018

(30) Foreign Application Priority Data

Sep. 30, 2015 (JP) .................................. 2015-193764
Aug. 24, 2016 (JP) .................................. 2016-163887

(51) Int. Cl.
*F02D 9/02* (2006.01)
*F02D 9/10* (2006.01)
(Continued)

(52) U.S. Cl.
CPC ............ *F16F 1/025* (2013.01); *F02D 9/1065* (2013.01); *F16F 1/06* (2013.01); *F16F 1/48* (2013.01); *F02D 2009/0264* (2013.01); *F02D 2009/0269* (2013.01); *F16F 2234/00* (2013.01); *F16F 2236/08* (2013.01); *F16F 2238/024* (2013.01); *F16F 2238/028* (2013.01)

(58) Field of Classification Search
CPC .......... F02D 2009/0269; F16F 2234/00; F16F 2236/08; F16F 2238/024; F16F 2238/028
USPC ........ 123/361, 396, 399, 397, 398, 400, 403
See application file for complete search history.

(56) References Cited

U.S. PATENT DOCUMENTS 6,640,776 B2 * 11/2003 Torii ..................... F02D 9/1065
                                                                   123/396
6,918,374 B1    7/2005 Kurita et al.
(Continued)

*Primary Examiner* — Hieu T Vo
*Assistant Examiner* — Arnold Castro
(74) *Attorney, Agent, or Firm* — Nixon & Vanderhye P.C.

(57) ABSTRACT

A torsion spring that is used in a throttle valve device increasing and decreasing an opening degree of an intake passage or an exhaust passage of an internal-combustion engine includes: two coil springs connected with each other so that torsion directions are opposite from each other; and a hook disposed between the two coil springs. Of the two coil springs, one side spring arranged at one side in an axial direction biases a valve object to a closing side, and the other side spring arranged at the other side in the axial direction biases the valve object to an opening side. In at least one coil spring of the two coil springs, a dimension of a clearance between the at least one coil spring and the hook connected with each other is larger than an average value of clearances between coil turns of the at least one coil spring.

15 Claims, 16 Drawing Sheets

(51) Int. Cl.
    *F16F 1/06*       (2006.01)
    *F16F 1/48*       (2006.01)
    *F16F 1/02*       (2006.01)

(56) References Cited

U.S. PATENT DOCUMENTS

| | | | |
|---|---|---|---|
| 6,925,986 B2* | 8/2005 | Cannone | F02D 9/02 123/396 |
| 7,063,067 B2* | 6/2006 | Kado | F02D 9/1035 123/399 |
| 2001/0000574 A1* | 5/2001 | Wayama | F02D 9/1065 123/337 |
| 2001/0000868 A1 | 5/2001 | Wayama et al. | |
| 2001/0000869 A1 | 5/2001 | Wayama et al. | |
| 2001/0035157 A1 | 11/2001 | Wayama et al. | |
| 2002/0189585 A1 | 12/2002 | Wayama et al. | |
| 2003/0172905 A1 | 9/2003 | Wayama et al. | |
| 2003/0178003 A1 | 9/2003 | Wayama et al. | |
| 2004/0060542 A1 | 4/2004 | Wayama et al. | |
| 2004/0173184 A1* | 9/2004 | Tanimura | F02D 9/1065 123/399 |
| 2005/0178359 A1 | 8/2005 | Wayama et al. | |
| 2006/0231072 A1* | 10/2006 | Saito | F02D 9/1065 123/396 |
| 2008/0011269 A1* | 1/2008 | Tanimura | F02D 41/107 123/337 |
| 2011/0056461 A1* | 3/2011 | Kondo | F02D 9/105 123/403 |

\* cited by examiner (a)

(b)

(a)

(b)

(a)

(b)

(a)

(b)

(a)

(b)

(a)

(b)

(a)

(b)

TORSION SPRING

CROSS REFERENCE TO RELATED APPLICATION

This application is the U.S. national phase of International Application No. PCTI/JP2016/077606 filed Sep. 19, 2016, which designated the U.S. and claims priority to Japanese Patent Application No. 2015-193764 filed on Sep. 30, 2015 and Japanese Patent Application No. 2016-163887 filed on Aug. 24, 2016, the entire contents of each of which are hereby incorporated herein by reference.

TECHNICAL FIELD

The present disclosure relates to a torsion spring used for a throttle valve device which increases and decreases an opening degree of an intake passage or an exhaust passage of an internal-combustion engine.

BACKGROUND ART

Patent Literature 1 discloses a throttle device which increases and decreases an opening degree of an intake passage of an internal-combustion engine, and the intake passage is opened slightly while operation of the internal-combustion engine is stopped. That is, the intake passage is maintained to have the minute opening degree while the operation of the internal-combustion engine is stopped, and the minute opening degree is hereafter referred to a default opening degree.

The throttle device of Patent Literature 1 includes a valve object, an electromotive actuator, and a torsion coil spring. The valve object is rotatably housed in an intake passage, and increases and decreases the opening degree of the intake passage. The actuator has an electric motor and a reduction gear. Torque produced by the electric motor is increased by the reduction gear, and is transmitted to the valve object, such that the valve object can be rotated on both sides to open and close. The coil spring has a return spring and a default spring. The return spring mainly biases the valve object to a closing side during operation of an internal-combustion engine, and the default spring mainly biases the valve object to an opening side while the operation of the internal-combustion engine is stopped.

A throttle device having a default opening degree is known, in which one torsion spring integrally has a return spring and a default spring to reduce the number of the components (refer to Patent Literature 2).

In Patent Literature 2, two torsion coil springs respectively functioning as a return spring and a default spring are connected with each other so that the torsion directions are opposite from each other. Moreover, a middle hook having U-shape is disposed between the two coil springs, e.g., a coil spring called as one side spring arranged at one side in the axial direction, and a coil spring called as the other side spring arranged at the other side in the axial direction. The axial direction means a direction of the axis of the torsion spring.

When the one side spring functions as the return spring, and when the other side spring functions as the default spring, one end of the one side spring in the axial direction is hooked on a locking part defined in, for example, a housing to be fixed, and the other end of the other side spring in the axial direction is hooked on a rotor rotated by an actuator to be rotatable. The middle hook is rotatable or fixed depending on the rotation angle of a valve object. Specifically, the middle hook is rotatable when the rotation angle is on the opening side of a rotation angle corresponding to a default opening degree, and the middle hook is fixed when the rotation angle is on the closing side of the rotation angle corresponding to the default opening degree.

When the rotation angle of the valve object is on the opening side than the rotation angle corresponding to the default opening degree, the middle hook is rotatable by being hooked by an engaging piece defined in the rotor. When the rotation angle of the valve object is on the closing side than the rotation angle corresponding to the default opening degree, the middle hook is fixed by the locking part of the housing.

In the coil spring of Patent Literature 2, the middle hook functions as a torque change part where the torque changes. However, a portion near the middle hook may be affected in the orientation when attaching the torsion spring to a throttle device. For this reason, a clearance between coil turns may become narrow at the location near the middle hook, and a contact may occur between the coil turns adjacent to each other in the axial direction.

PRIOR ART LITERATURES

Patent Literature

Patent Literature 1: JP 2000-110589 A
Patent Literature 2: JP 2011-058408 A

SUMMARY OF INVENTION

It is an object of the present disclosure to provide a torsion spring used for a throttle valve device which increases and decreases an opening degree of an intake passage or an exhaust passage of an internal-combustion engine, the torsion spring biasing a valve object to the closing side or the opening side to restrict a contact between coil turns at a location near a middle hook.

According to an aspect of the present disclosure, a torsion spring is used in a throttle valve device increasing and decreasing an opening degree of an intake passage or an exhaust passage of an internal-combustion engine, and includes: two coil springs connected with each other so that torsion directions are opposite from each other; and a hook disposed between the two coil springs. The throttle valve device includes a valve object housed in the intake passage or the exhaust passage to be rotatable, and increases and decreases the opening degree of the intake passage or the exhaust passage. Of the two torsion coil springs, one side spring arranged at one side in an axial direction biases the valve object to a closing side, and the other side spring arranged at the other side in the axial direction biases the valve object to an opening side, such that the torsion spring is assembled to the throttle valve device.

In at least one coil spring of the two coil springs, a dimension of a clearance between the at least one coil spring and the hook connected with each other is larger than an average value of clearances between coil turns of the at least one coil spring.

Thereby, a contact between the coil turns can be restricted in at least one of the nearest clearances the nearest to the middle hook which is disposed between the one side spring and the other side spring.

Therefore, a contact between the turns can be restricted at a location adjacent to the middle hook in the torsion spring that is assembled to the throttle valve device to bias the valve object to the closing side and the opening side.

DESCRIPTION OF EMBODIMENTS

First Embodiment

Figure 1:
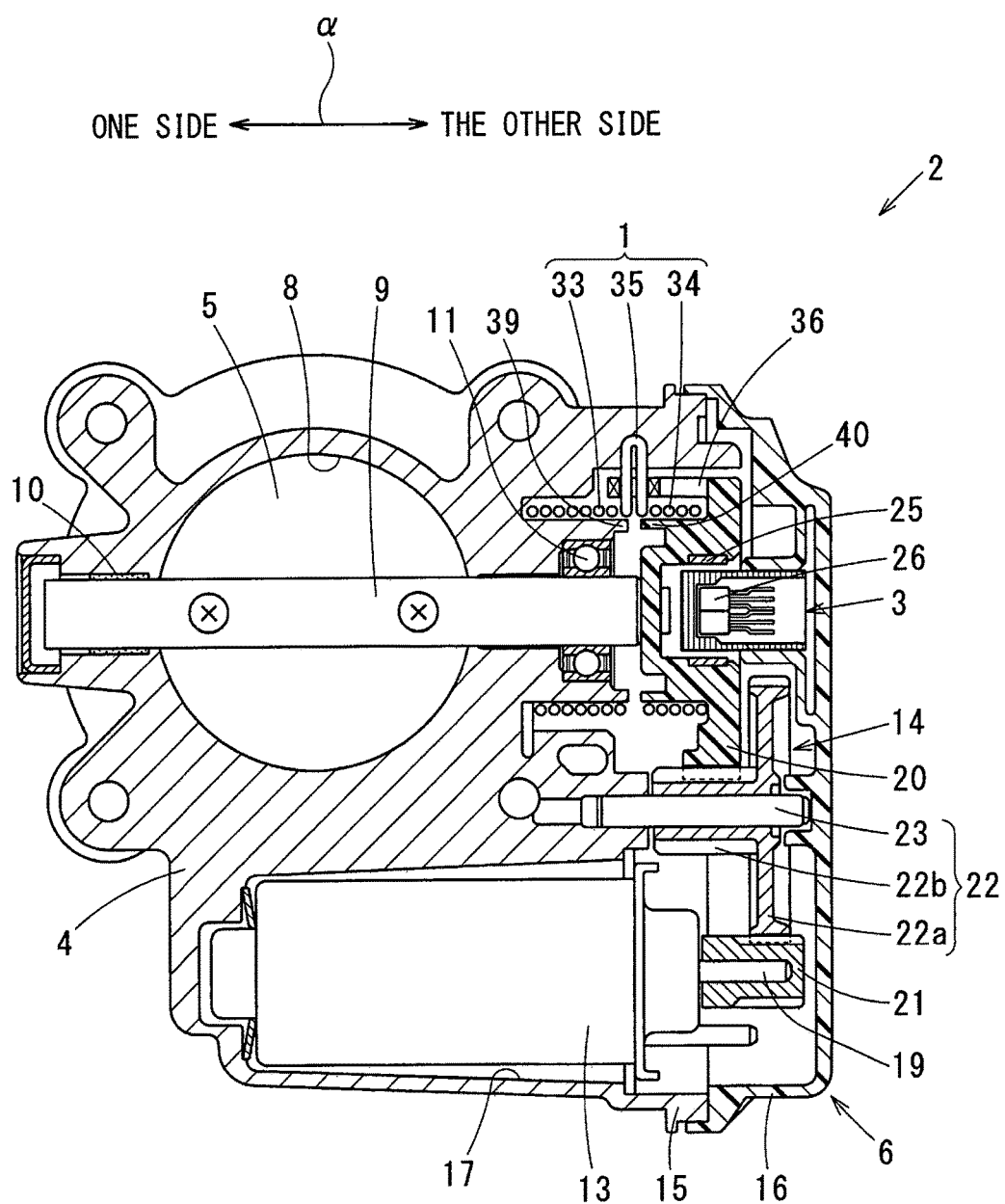
FIG. 1 is a sectional view illustrating an inside of a throttle valve device (according to a first embodiment).
Figure 2:
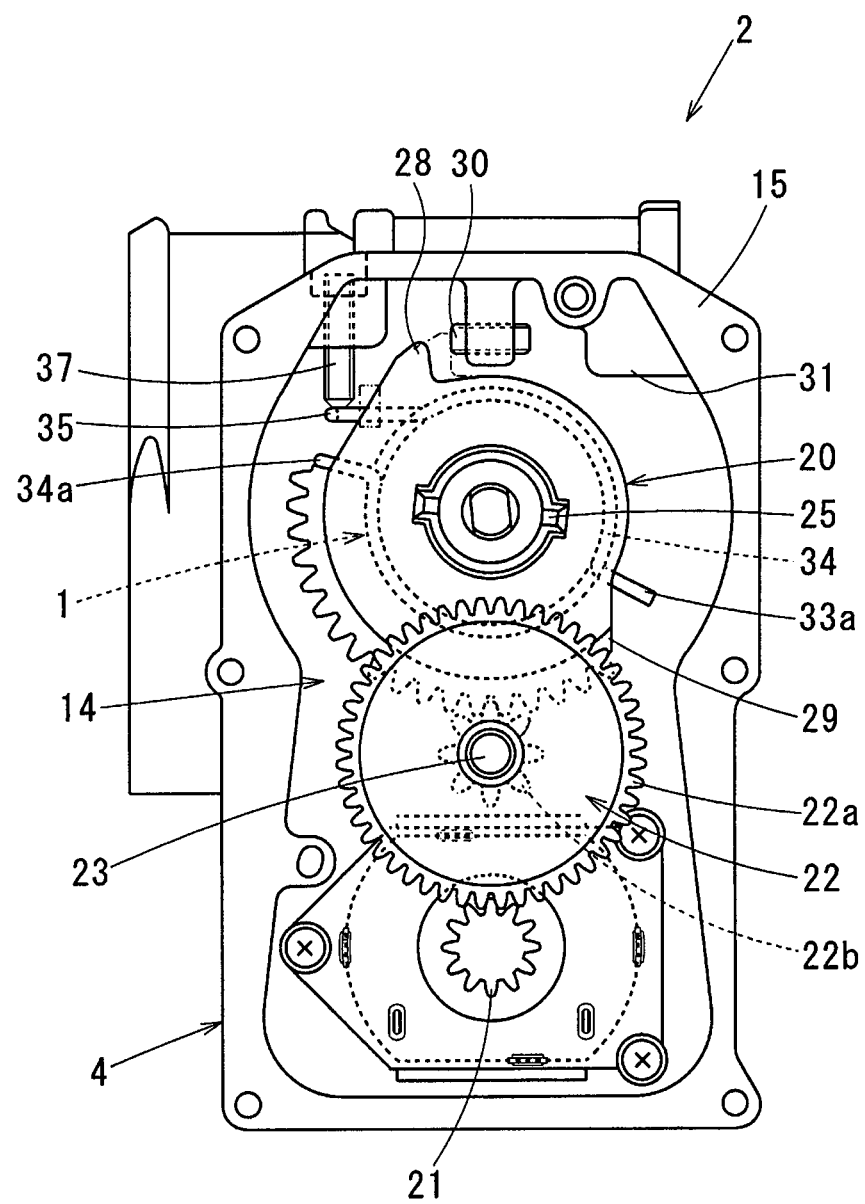
FIG. 2 is an internal view of the throttle valve device (of the first embodiment) by removing a gear cover.

A torsion spring 1 according to a first embodiment is explained based on FIG. 1 to FIG. 5.

First, a throttle valve device 2 is explained in which the torsion spring 1 is used.

The throttle valve device 2 is mounted, for example, in an engine compartment of a vehicle, and increases and decreases an opening degree of an intake passage of an internal-combustion engine (not shown). The throttle valve device 2 is controlled by an electronic control unit (not shown: referred to as ECU) which controls operation of the internal-combustion engine. ECU mainly calculates an instruction value of the opening degree of the intake passage based on an amount of accelerator operation of the vehicle, and controls the throttle valve device 2 so that a detection value of rotation angle acquired from a rotation angle sensor 3 to be described below becomes equal to a numerical value corresponding to the instruction value.

The throttle valve device 2 includes a body 4, a valve object 5, and an electromotive actuator 6 to be explained below in addition to the torsion spring 1.

The body 4 has a cylindrical bore 8, and the bore 8 defines a part of the intake passage. The body 4 is connected to an intake manifold (not shown) of the internal-combustion engine with a connecting member such as a bolt.

The valve object 5 is a disk-shaped butterfly valve, and is rotatably housed in the bore 8 in the state where the valve object 5 is fixed to a shaft 9 to increase and decrease the opening degree of the intake passage. The shaft 9 is assembled to cross with the bore 8 and to extend in a radial direction α, and is supported by the body 4 to be rotatable with what is called a both end support structure. That is, one end of the shaft 9 in the radial direction α is supported by a dry bearing 10, and the other end is supported by a ball bearing 11.

The actuator 6 has an electric motor 13 and a reduction gear 14. Torque generated by the electric motor 13 is amplified by the reduction gear 14, and is transmitted to the valve object 5 to drive the valve object 5 to rotate mainly to the opening side.

The body 4 has a gear case 15 mainly housing the reduction gear 14, at the other side of the bore 8 in the radial direction α (namely, right side of the bore 8 in FIG. 1), and an opening of the gear case 15 is closed by a gear cover 16. The body 4 has a motor housing 17 which houses the electric motor 13. The motor housing 17 is open to the gear case 15 such that the axis of the electric motor 13 is parallel to the axis of the shaft 9.

The output shaft 19 of the electric motor 13 can rotate both in a normal direction and a reverse direction by controlling the energizing direction, and is controlled by ECU.

The reduction gear 14 includes a valve gear 20 coaxially assembled to the shaft 9, a pinion gear 21 assembled to the output shaft 19, and a middle gear 22 meshing with both the valve gear 20 and the pinion gear 21. The middle gear 22 is rotatably supported by a supporting shaft 23 between the gear case 15 and the gear cover 16. The middle gear 22 has a large diameter gear part 22a which meshes with the pinion gear 21, and a small diameter gear part 22b which meshes with the valve gear 20. The small diameter gear part 22b is prepared to have the same axis as the large diameter gear part 22a. The valve gear 20 consists of a sector gear, and has a gear part which meshes with the small diameter gear part 22b around the own perimeter.

A divided type permanent magnet 25 which rotates with the shaft 9 is assembled to the valve gear 20. The permanent magnet 25 and a Hall device 26 assembled to the gear cover 16 define a rotation angle sensor 3 which detects the rotation angle of the valve object 5. A signal generated by the rotation angle sensor 3 is outputted to ECU, and ECU controls the throttle valve device 2 by controlling the energizing of the electric motor 13 based on the signal inputted from the rotation angle sensor 3.

The valve gear 20 has a full closing time locking part 28 and a full open time locking part 29 for mechanically setting a full closing time rotation angle and a full open time rotation angle of the valve object 5 respectively. The full closing time locking part 28 is in contact with a full closing stopper 30, when the valve object 5 rotates up to the full closing rotation angle. The full open time locking part 29 is in contact with a full open stopper 31, when the valve object 5 rotates up to the full open rotation angle. Both of the full closing stopper 30 and the full open stopper 31 are defined in, for example, in the gear case 15. The full closing stopper 30 may be, for example, an adjustment screw screwed on the inner wall of the gear case 15. The full open stopper 31 may be, for example, a step part defined on the inner wall of the gear case 15.

The torsion spring 1 includes twist-type two coil springs 33 and 34 connected with each other so that the torsion directions are opposite from each other, and a middle hook 35 interposed between the two coil springs 33 and 34. The two coil springs 33 and 34 bias the valve object 5 as follows, in the state where the torsion spring 1 is assembled to the throttle valve device 2.

Of the coil springs 33 and 34, the coil spring 33 (hereafter called as one side spring 33) arranged at one side in the axial direction biases the valve object 5 to a closing side, and the coil spring 34 (hereafter called as the other side spring 34) arranged at the other side in the axial direction biases the valve object 5 to the opening side.

The axial direction of the torsion spring 1 is in agreement with the radial direction α of the bore 8. Furthermore, the one side and the other side in the axial direction of the torsion spring 1 are respectively in agreement with the one side and the other side of the radial direction α. So, the illustration of the axial direction of the torsion spring 1 is omitted in FIG. 1 and FIG. 3.

The torsion spring 1 consists of one wire element, and the middle hook 35 is formed by bending the wire element to have the U-shape. The middle hook 35 forms a space (hereafter called as a hook gap A) in the axial direction by bending the wire element (refer to FIG. 4 and FIG. 5). One end of the middle hook 35 in the axial direction is connected the other end of the one side spring 33 in the axial direction, and the other end of the middle hook 35 in the axial direction is connected to the one end of the other side spring 34 in the axial direction.

A hook 33a is formed at one end of the one side spring 33 in the axial direction, and the hook 33a is hooked and fixed to, for example, the locking part 33b defined in the gear case 15. Furthermore, a hook 34a is formed at the other end of the other side spring 34 in the axial direction. The hook 34a is hooked on an engaging piece 36 defined in the valve gear 20, and is rotatable with the valve gear 20.

The middle hook 35 becomes rotatable or is fixed according to the rotation angle of the valve object 5. Namely, when the rotation angle of the valve object 5 is on the opening side than a rotation angle corresponding to a default opening degree, the middle hook 35 becomes rotatable by being hooked by the engaging piece 36. When the rotation angle of the valve object 5 is on the closing side than the rotation angle corresponding to the default opening degree, the middle hook 35 is caught and fixed to the locking part 37, for example, of the housing.

The engaging piece 36 has a guide 36a which prevents a horizontal deviation of the middle hook 35. Moreover, the locking part 37 consists of, for example, an adjustment screw assembled at a predetermined position of the wall part of the gear case 15. The middle hook 35 is assembled to the throttle valve device 2 in the state where the middle hook 35 is bent to the perimeter side of the other side spring 33 and the other side spring 34.

The one side spring 33 functions as a return spring which biases the valve object 5 to the closing side during operation of the internal-combustion engine, and the actuator 6 drives the valve object 5 to rotate on the opening side against the biasing force of the one side spring 33. The other side spring 34 functions as a default spring which biases the valve object 5 to the opening side while the operation of the internal-combustion engine is stopped.

Moreover, one side bush 39 is arranged at the inner circumference of the one side spring 33, and has an outer periphery surface in contact with the inner circumference of the one side spring 33. The other side bush 40 is arranged at the inner circumference of the other side spring 34, and has an outer periphery surface in contact with the inner circumference of the other side spring 34.

The one side bush 39 shaped in a cylinder is a part of the body 4, and is projected to the other side in the axial direction from the gear case 15. The inner circumference of the one side bush 39 defines a space housing the ball bearing 11. The other side bush 40 is formed integrally and coaxially with the valve gear 20, and is shaped in a cylinder. The other side bush 40 is projected to the one side in the axial direction, in the gear case 15, and a gap (hereafter called as bush gap B) is defined between the other side bush 40 and the one side bush 39 in the axial direction (refer to FIG. 5).

Figure 4:
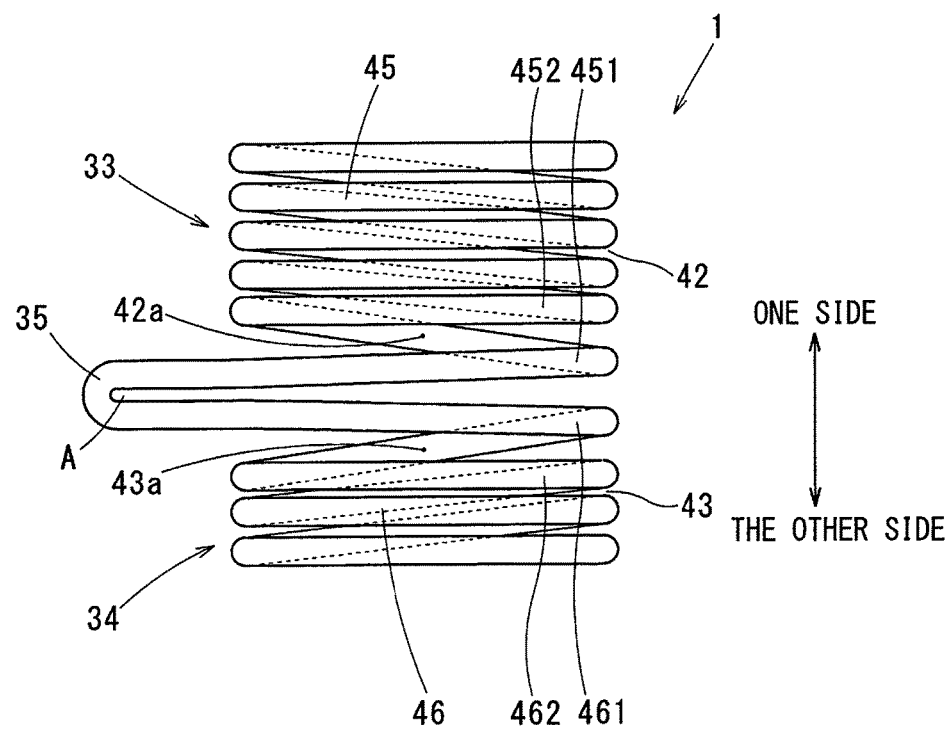
FIG. 4 includes (a) an explanatory view illustrating the torsion spring and (b) a plan view illustrating the torsion spring (of the first embodiment).
Figure 4:
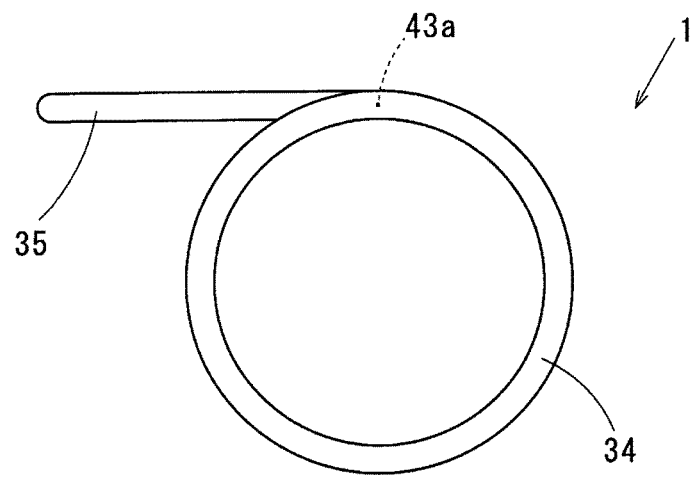
Figure 5:
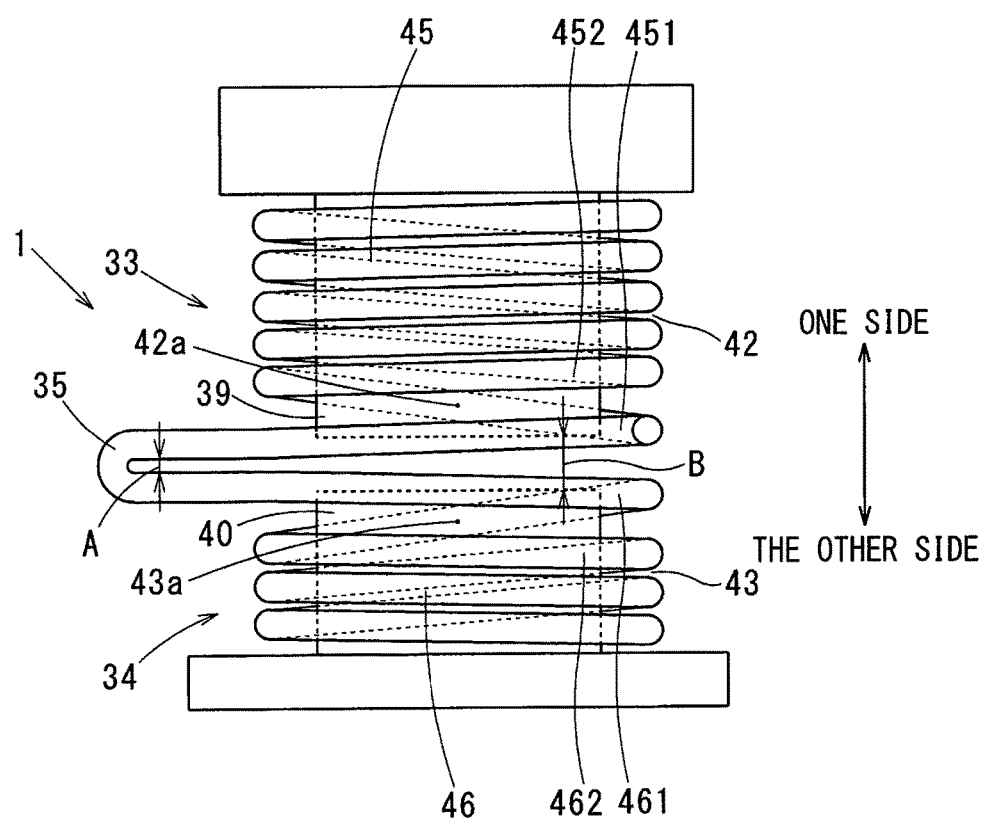
FIG. 5 is a diagram illustrating the torsion spring assembled to one side bush and the other side bush (of the first embodiment).

The torsion spring 1 of the first embodiment is explained based on FIG. 4 and FIG. 5 in more detail. FIG. 4 and FIG. 5 illustrate the middle hook 35 before being bent to the outer side.

The one side spring 33 and the other side spring 34 have turn clearances 42 and turn clearances 43 respectively. Among the turn clearances 42 of the one side spring 33, a dimension of a turn clearance 42a located at a connection part where the one side spring 33 and the middle hook 35 are connected with each other is larger than the average value of the turn clearances 42 in the state before and after the torsion spring 1 is assembled to the throttle valve device 2.

Figure 3:
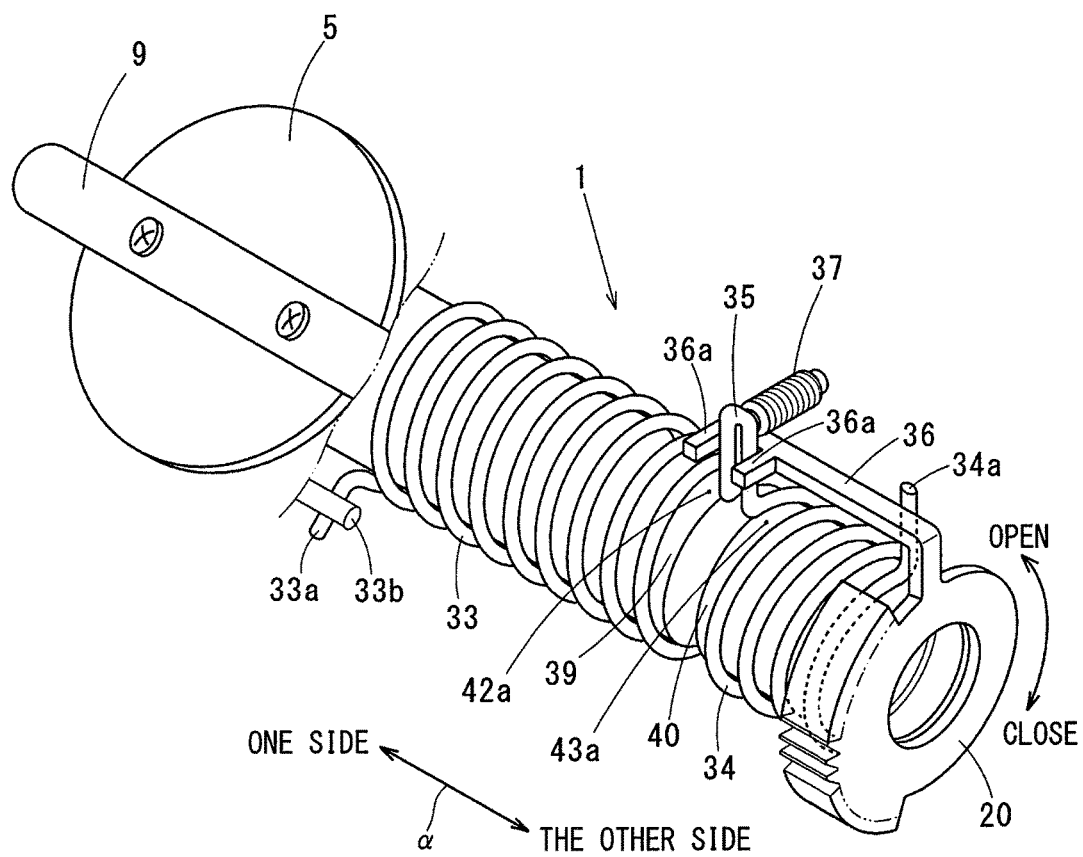
FIG. 3 is a perspective view illustrating a torsion spring (of the first embodiment).

The connection part between the one side spring 33 and the middle hook 35 is a root of the middle hook 35, in the state where the middle hook 35 is bent to the radially outer side (refer to FIG. 3).

In the state before bending the middle hook 35 to the radially outer side (refer to FIG. 4), the middle hook 35 is extended straightly, for example, in a tangential direction from a circle defined by the one side spring 33. In the state before bending the middle hook 35 to the radially outer side, the root of the middle hook 35, i.e., the connection part between the one side spring 33 and the middle hook 35 is a point of contact between the circle defined by the one side spring 33 and the straight line formed by the middle hook 35.

Figure 6:
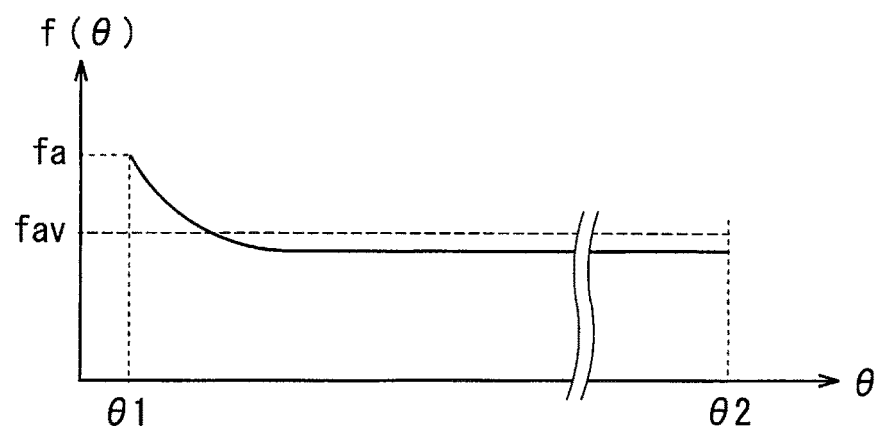
FIG. 6 includes (a) a characteristic view illustrating distribution of clearances between adjacent turns of one side spring and (b) a characteristic view illustrating distribution of clearances between adjacent turns of the other side spring (of the first embodiment).
Figure 6:
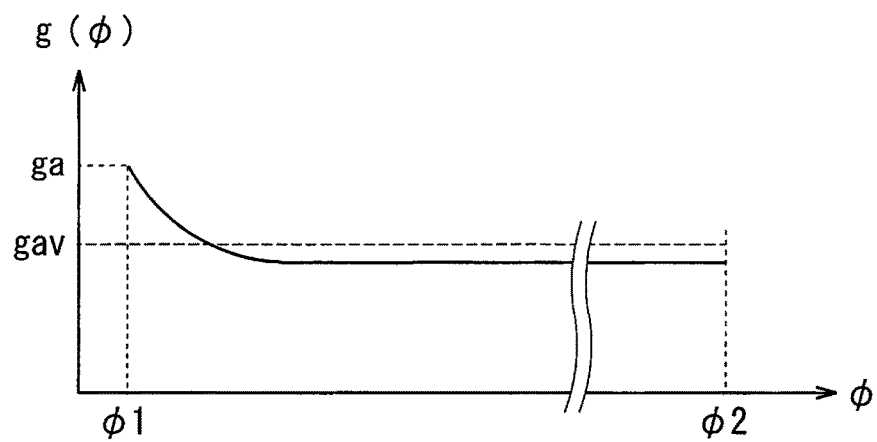

When the rotation angle θ is defined in a circumferential direction, as shown in (a) of FIG. 6, the dimension of the turn clearance 42 is continuously distributed relative to the rotation angle θ. When the dimension of the turn clearance 42 is expressed with f(θ) in which the rotation angle θ is a variable, and when the average value of the turn clearances 42 is expressed by fav, the average value fav is computable with the following expression 1 using the rotation angle θ1 corresponding to the root of the middle hook 35 and the rotation angle θ2 corresponding to the root of the hook 33a. In addition, the dimension of the turn clearance 42a is expressed by fa.

$$fav = \frac{1}{\theta 2 - \theta 1} \int_{\theta 1}^{\theta 2} f(\theta) d\theta \qquad \text{[Expression 1]}$$

Similarly, among the turn clearances 43 of the other side spring 34, the dimension of a turn clearance 43a located at the connection part between the other side spring 34 and the middle hook 35 is larger than the average value of the turn clearances 43 in the state before and after the torsion spring 1 is assembled to the throttle valve device 2.

The connection part between the other side spring 34 and the middle hook 35 can be explained in a similar manner as the connection part between the one side spring 33 and the middle hook 35.

When the rotation angle ϕ is defined in a circumferential direction, as shown in (b) of FIG. 6, the dimension of the turn clearance 43 is continuously distributed relative to the rotation angle ϕ. When the dimension of the turn clearance 43 is expressed by g(ϕ) in which the rotation angle ϕ is a variable, and when the average value of the turn clearances 43 is expressed by gav, the average value gav is computable with the following expression 2 using the rotation angle ϕ1 corresponding to the root of the middle hook 35 and the rotation angle ϕ2 corresponding to the root of the hook 34a. In addition, the dimension of the turn clearance 43a is expressed by ga.

$$gav = \frac{1}{\phi 2 - \phi 1} \int_{\phi 1}^{\phi 2} g(\phi) d\phi \qquad \text{[Expression 2]}$$

Thereby, the coil turns can be restricted from contacting at the turn clearance 42a and the turn clearance 43a the nearest to the middle hook 35, in each of the one side spring 33 and the other side spring 34. Thus, the coil turns in the torsion spring 1 can be restricted from contacting at a location adjacent to the middle hook 35.

In addition, the number of turns is larger in the one side spring 33 than in the other side spring 34. Moreover, the hook gap A is constant. That is, while moving along the middle hook 35 from the tip end to the other end of the one side spring 33 in the axial direction and the one end of the other side spring 34 in the axial direction, the hook gap A is constant.

Moreover, various configurations are employable in order to make the dimension fa of the turn clearance 42a to be larger than the average value fav.

For example, as shown in (a) of FIG. 6, f(θ) may be set so that f(θ) becomes the maximum at the root of the middle hook 35 (so that fa becomes the maximum value of f(θ)). Moreover, of the plural turns 45 of the one side spring 33, a first turn 45 located the most other side in the axial direction is defined as a turn 451, and a second turn 45 is defined as a turn 452. While turning along the turn 451 toward the turn 452 in the one side spring 33, f(θ) may be increased up to a middle position, and f(θ) may be decreased after passing the middle position.

Similarly, various configurations are employable in order to make the dimension ga of the turn clearance 43a to be larger than the average value gav of the turn clearances 43.

For example, g(ϕ) may be set so that g(ϕ) becomes the maximum at the root of the middle hook 35 (so that ga becomes the maximum value of g(ϕ)). Moreover, of the plural turns 46 of the other side spring 34, a first turn 46 located the most one side in the axial direction is defined as a turn 461, and a second turn 46 is defined as a turn 462. g(ϕ) may be increased up to a middle position while turning toward the turn 462 along the turn 461 in the other side spring 34, and g(ϕ) may be decreased after passing the middle position.

According to the first embodiment, in the other side spring 34 of the torsion spring 1, the dimension ga of the turn clearance 43a is larger than the average value gav of the turn clearances 43.

According to the torsion spring 1, the other side spring 34 biasing to the opening side has much possibility where a contact is generated between the coil turns than the one side spring 33 biasing to the closing side, and the turn numbers of the other side spring 34 biasing to the opening side is smaller than the turn numbers of the one side spring 33 biasing to the closing side, due to general loading restrictions. Therefore, a contact between the coil turns can be notably restricted in the other side spring 34 biasing to the opening side and having few turn numbers, by making the turn clearance 43a to be larger than the average value gav.

Second Embodiment

Figure 7:
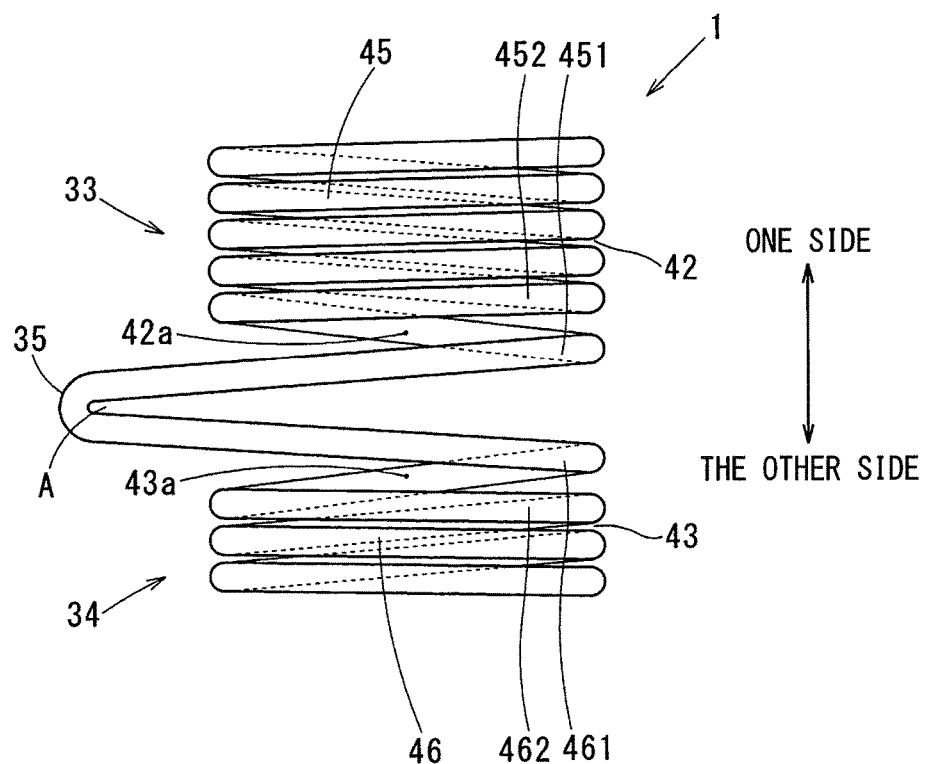
FIG. 7 includes (a) an explanatory view illustrating a torsion spring and (b) a plan view illustrating the torsion spring (according to a second embodiment).
Figure 7:
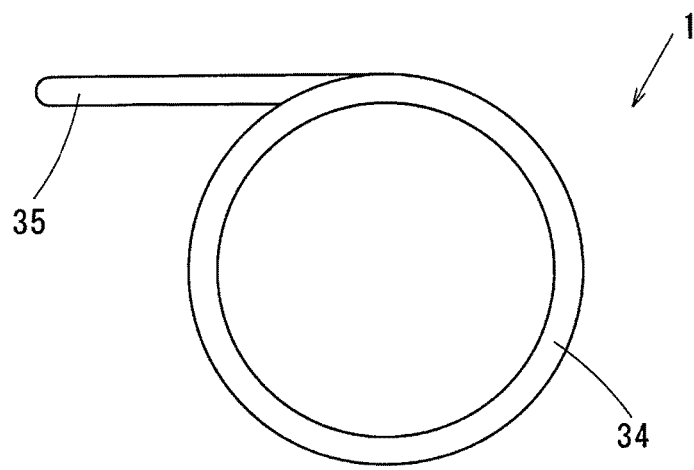
Figure 8:
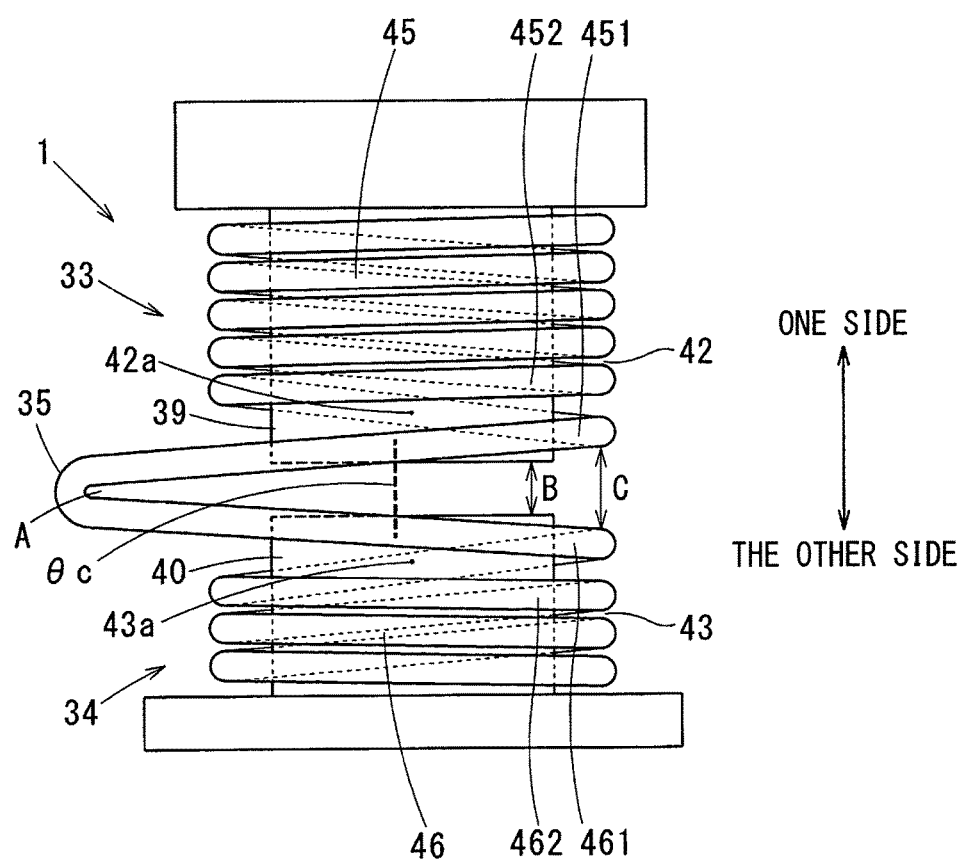
FIG. 8 is a diagram illustrating the torsion spring assembled to one side bush and the other side bush (of the second embodiment).

A torsion spring 1 according to a second embodiment is explained based on FIG. 7 and FIG. 8. In FIG. 7 and FIG. 8, the middle hook 35 is illustrated in the state before being bent to the radially outer side.

According to the torsion spring 1 of the second embodiment, similarly to the torsion spring 1 of the first embodiment, the turn clearance 42a and the turn clearance 43a are respectively larger than the average value fav of the turn clearances 42 and the average value gav of the turn clearances 43 in the state before and after the torsion spring 1 is assembled to the throttle valve device 2.

A spring gap C is defined as follows, in order for explaining the torsion spring 1 of the second embodiment. The spring gap C is a gap formed in the axial direction between the turn 451 of the one side spring 33 and the turn 461 of the other side spring 34, in the state where the torsion spring 1 is assembled to the one side bush 39 and the other side bush 40.

While turning along the turn 451 toward the turn 452 in the one side spring 33, the spring gap C is smaller than the bush gap B before the rotation angle θ reaches a predetermined rotation angle θc. The spring gap C becomes larger than the bush gap B when passing the predetermined rotation angle θc (refer to FIG. 8). Meanwhile, the hook gap A gradually increases while approaching toward the other end of the one side spring 33 in the axial direction and the one end of the other side spring 34 in the axial direction from the tip end. At the other end of the one side spring 33 in the axial direction, and the one end of the other side spring 34 in the axial direction, the hook gap A becomes equal to the minimum value of the spring gap C. The spring gap C gradually increases while turning along the turn 451 toward the turn 452, and becomes larger than the bush gap B when passing the predetermined rotation angle θc.

According to the torsion spring 1 of the second embodiment, the spring gap C becomes larger than the bush gap B at a midpoint while turning along the turn 451 toward the turn 452 in the one side spring 33.

Thereby, the turns 451 and 461 can be prevented from being pinched by the bush gap B.

Third Embodiment

Figure 9:
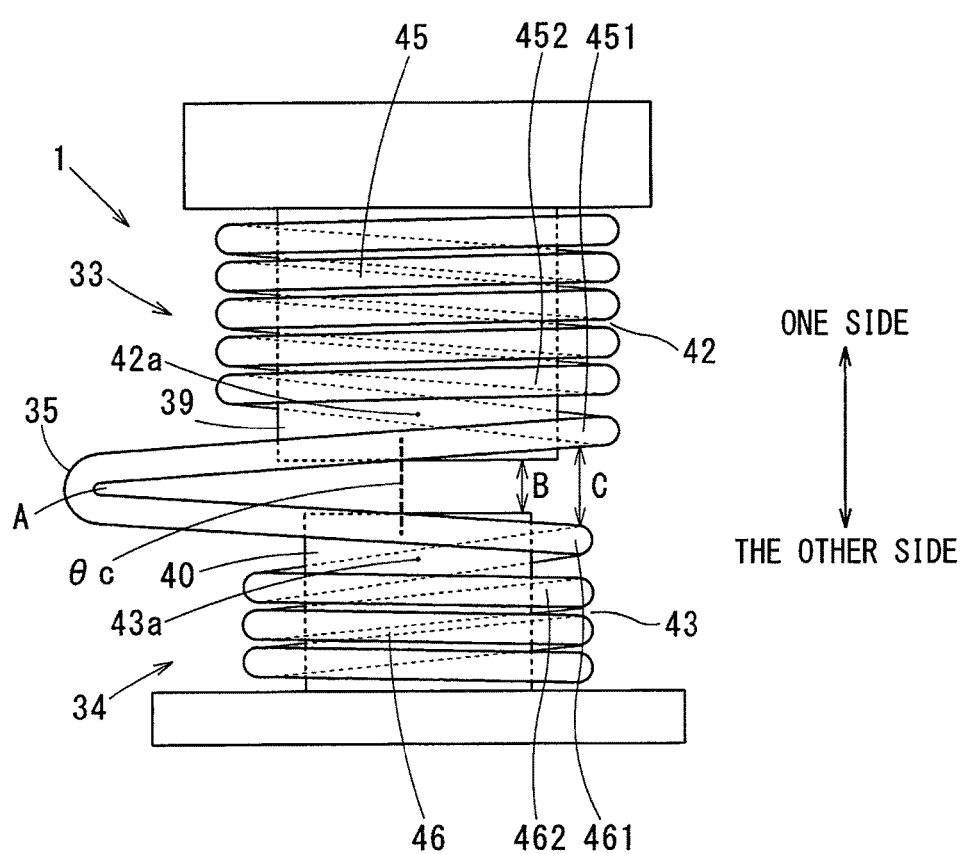
FIG. 9 is a diagram illustrating a torsion spring assembled to one side bush and the other side bush (according to a third embodiment).

A torsion spring 1 according to a third embodiment is explained based on FIG. 9. In FIG. 9, the middle hook 35 is illustrated in the state before being bent to the radially outer side.

According to the torsion spring 1 of the third embodiment, similarly to the torsion spring 1 of the first embodiment, the turn clearance 42a and the turn clearance 43a are respectively larger than the average value fav of the turn clearances 42 and the average value gav of the turn clearances 43 in the state before and after the torsion spring 1 is assembled to the throttle valve device 2. Moreover, similarly to the torsion spring 1 of the second embodiment, the spring gap C is smaller than the bush gap B until the rotation angle θ reaches the predetermined rotation angle θc, and becomes larger than the bush gap B after passing the predetermined rotation angle θc.

According to the torsion spring 1 of the third embodiment, the diameter of the one side spring 33 is larger than the diameter of the other side spring 34.

Thereby, the clearance in the radial direction relative to the other side bush 40 can be reduced in the other side spring 34 where a contact is easily generated between the coil turns. For this reason, the effect of restricting the contact between the coil turns can be further raised, since the other side bush 40 can restrict the torsion spring 1 from being affected in the orientation from the inner circumference side at the assembling time.

Fourth Embodiment

Figure 10:
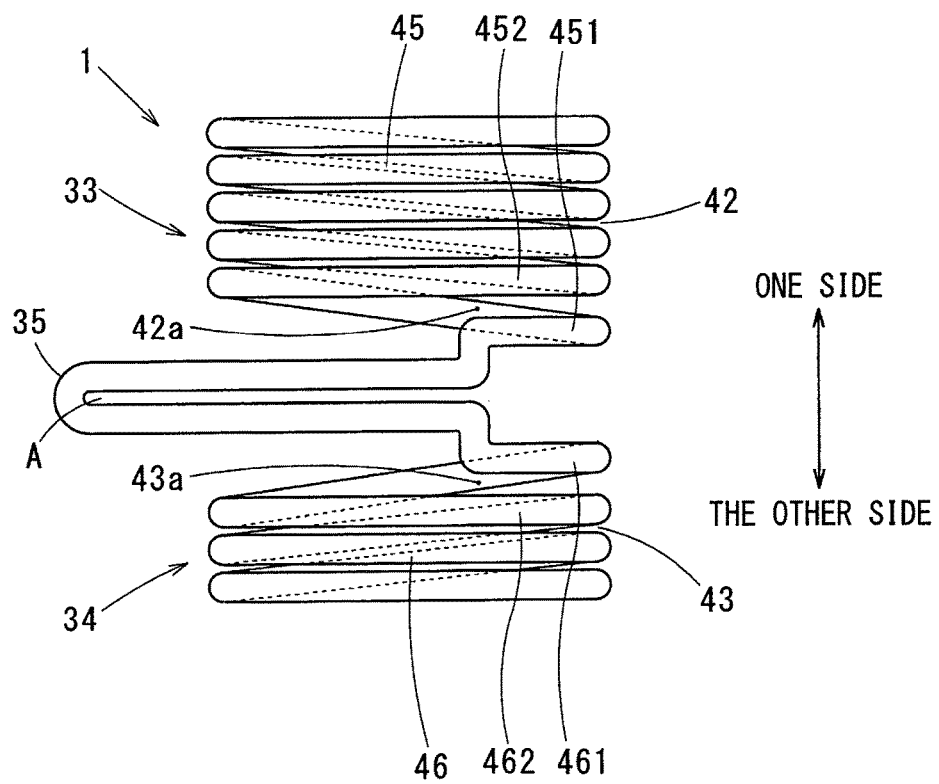
FIG. 10 includes (a) an explanatory view illustrating a torsion spring and (b) a plan view illustrating the torsion spring (according to a fourth embodiment).
Figure 10:
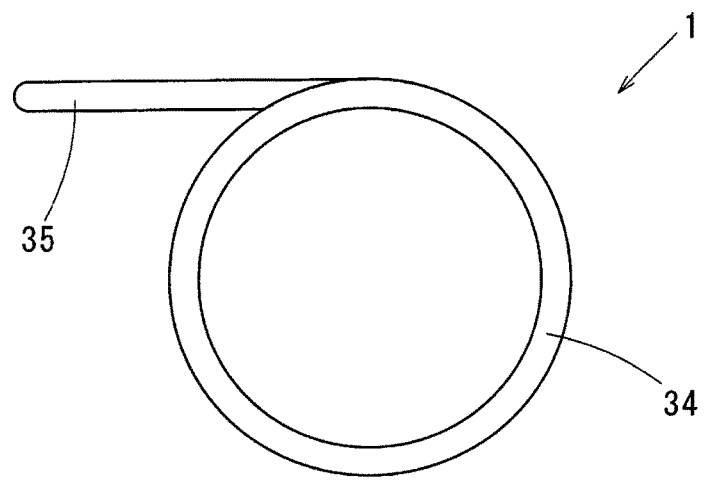
Figure 11:
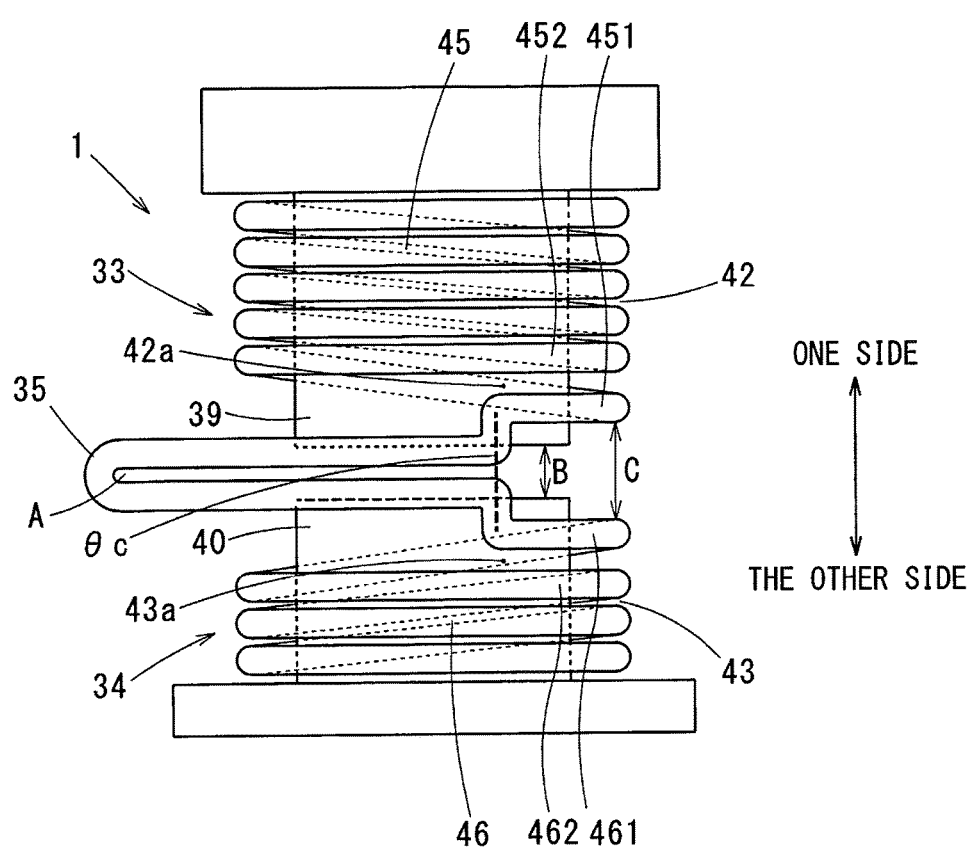
FIG. 11 is a diagram illustrating the torsion spring assembled to one side bush and the other side bush (of the fourth embodiment).

A torsion spring 1 according to a fourth embodiment is explained based on FIG. 10 and FIG. 11. In FIG. 10 and FIG. 11, the middle hook 35 is illustrated in the state before being bent to the radially outer side.

According to the torsion spring 1 of the fourth embodiment, similarly to the torsion spring 1 of the first embodiment, the turn clearance 42a and the turn clearance 43a are respectively larger than the average value fav of the turn clearances 42 and the average value gav of the turn clearances 43 in the state before and after the torsion spring 1 is assembled to the throttle valve device 2.

Moreover, according to the torsion spring 1 of the fourth embodiment, the spring gap C increases stepwise at the predetermined rotation angle θc described in the second embodiment (refer to FIG. 11). Meanwhile, the hook gap A is constant and does not change from the tip end to the other end of the one side spring 33 in the axial direction. Moreover, the spring gap C is fixed up to the predetermined rotation angle θc, and is equal to the hook gap A and is smaller than the bush gap B. The spring gap C increases stepwise at the predetermined rotation angle θc, and becomes larger than the bush gap B.

Therefore, when attaching the torsion spring 1 to the one side bush 39 and the other side bush 40, the positioning becomes easy so that the inner circumference of the turn 451 is not in contact with the edge of the one side bush 39 and that the inner circumference of the turn 461 is not in contact with the edge of the other side bush 40.

Fifth Embodiment

Figure 12:
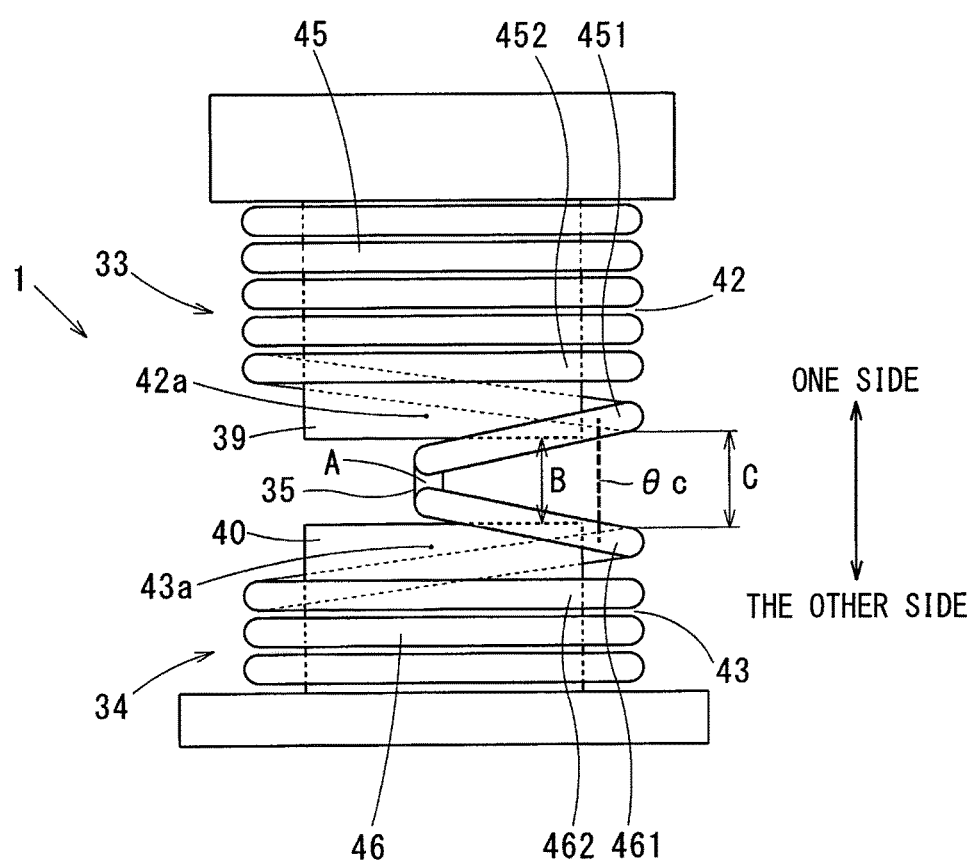
FIG. 12 includes (a) a diagram illustrating a torsion spring assembled to one side bush and the other side bush, and (b) a plan view illustrating the torsion spring (according to a fifth embodiment).
Figure 12:
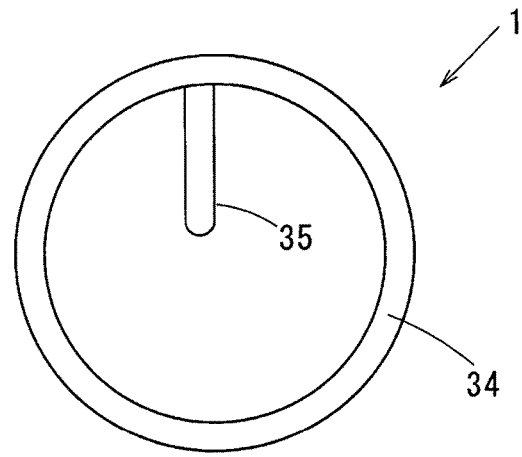

A torsion spring 1 according to a fifth embodiment is explained based on FIG. 12.

According to the torsion spring 1 of the fifth embodiment, similarly to the torsion spring 1 of the first embodiment, the turn clearance 42a and the turn clearance 43a are respectively larger than the average value fav of the turn clearances 42 and the average value gav of the turn clearances 43 in the state before and after the torsion spring 1 is assembled to the throttle valve device 2.

According to the torsion spring 1 of the fifth embodiment, the spring gap C becomes larger than the bush gap B at the predetermined rotation angle θc similarly to the torsion spring 1 of the second embodiment.

According to the torsion spring 1 of the fifth embodiment, the middle hook 35 is bent to the inner circumference side of the one side spring 33 and the other side spring 34, and is projected into the bush gap B.

That is, the spring gap C is made larger than the bush gap B while turning along the turn 451 toward the turn 452 in the one side spring 33, thereby bending the middle hook 35 to the radially inner side to be located in the bush gap B. For this reason, the dimension of the torsion spring 1 can be reduced in the radial direction.

Sixth Embodiment

Figure 13:
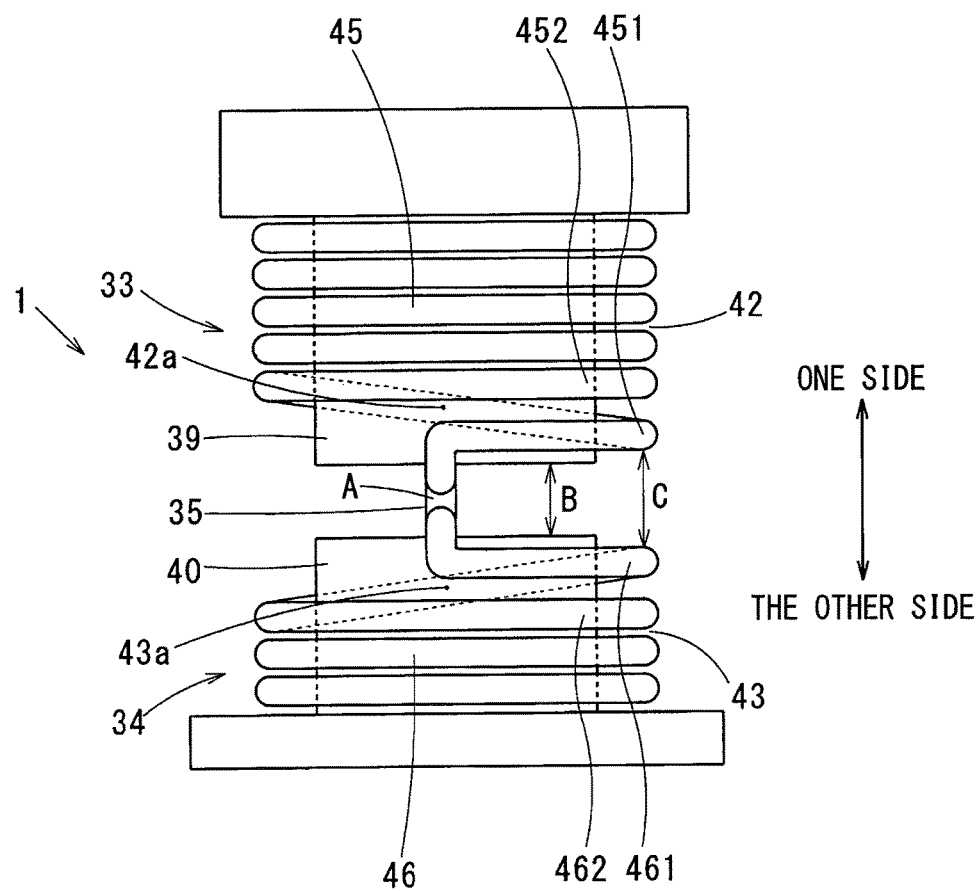
FIG. 13 includes (a) a diagram illustrating a torsion spring assembled to one side bush and the other side bush, and (b) a plan view illustrating the torsion spring (according to a sixth embodiment).
Figure 13:
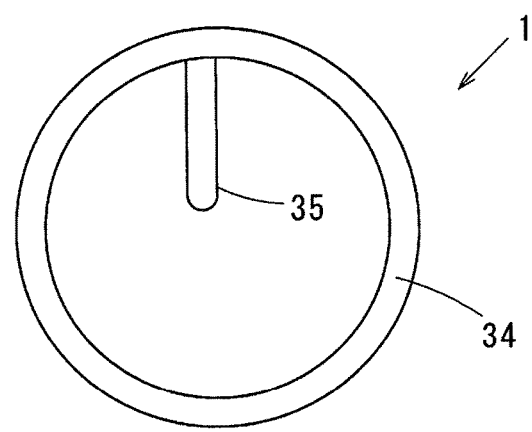

A torsion spring 1 according to a sixth embodiment is explained based on FIG. 13.

According to the torsion spring 1 of the sixth embodiment, similarly to the torsion spring 1 of the first embodiment, the turn clearance 42a and the turn clearance 43a are respectively larger than the average value fav of the turn clearances 42 and the average value gav of the turn clearances 43, in the state before and after the torsion spring 1 is assembled to the throttle valve device 2.

According to the torsion spring 1 of the sixth embodiment, similarly to the torsion spring 1 of the third embodiment, the spring gap C increases stepwise, and becomes larger than the bush gap B. The position where the spring gap C increases stepwise is a boundary between the middle hook 35, and the one side spring 33 and the other side spring 34, i.e., at the other end of the one side spring 33 in the axial direction, and the one end of the other side spring 34 in the axial direction. Moreover, the hook gap A is entirely smaller than the bush gap B, and the spring gap C is larger than the bush gap B all the circumferences.

According to the torsion spring 1 of the sixth embodiment, the middle hook 35 is bent to the inner circumference side of the one side spring 33 and the other side spring 34, and is projected into the bush gap B.

That is, the middle hook 35 can be bent to the inner circumference side to be located within the bush gap B, by increasing the spring gap C stepwise at the connection part between the middle hook 35, and the one side spring 33 and the other side spring 34. For this reason, the dimension of the torsion spring 1 can be reduced in the radial direction.

[Modification]

The present disclosure can be implemented with various modifications in a range not deviated from the scope of the present disclosure.

According to the torsion spring 1 of the embodiments, the turn clearance 42a and the turn clearance 43a are respectively larger than the average value fav of the turn clearances 42 and the average value gav of the turn clearances 43 in the state before and after the torsion spring 1 is assembled to the throttle valve device 2. However, the turn clearance 42 and the turn clearance 43 are not limited to such configuration. For example, the turn clearance 42a and the turn clearance 43a may be set equal to the average value fav of the turn clearances 42 and the average value gav of the turn clearances 43, respectively, in the state after the torsion spring 1 is assembled to the throttle valve device 2.

The diameter of the one side spring 33 is larger than the diameter of the other side spring 34, and the diameter of the one side bush 39 is larger than the diameter of the other side bush 40, in the torsion spring 1 of the third embodiment.

Figure 14:
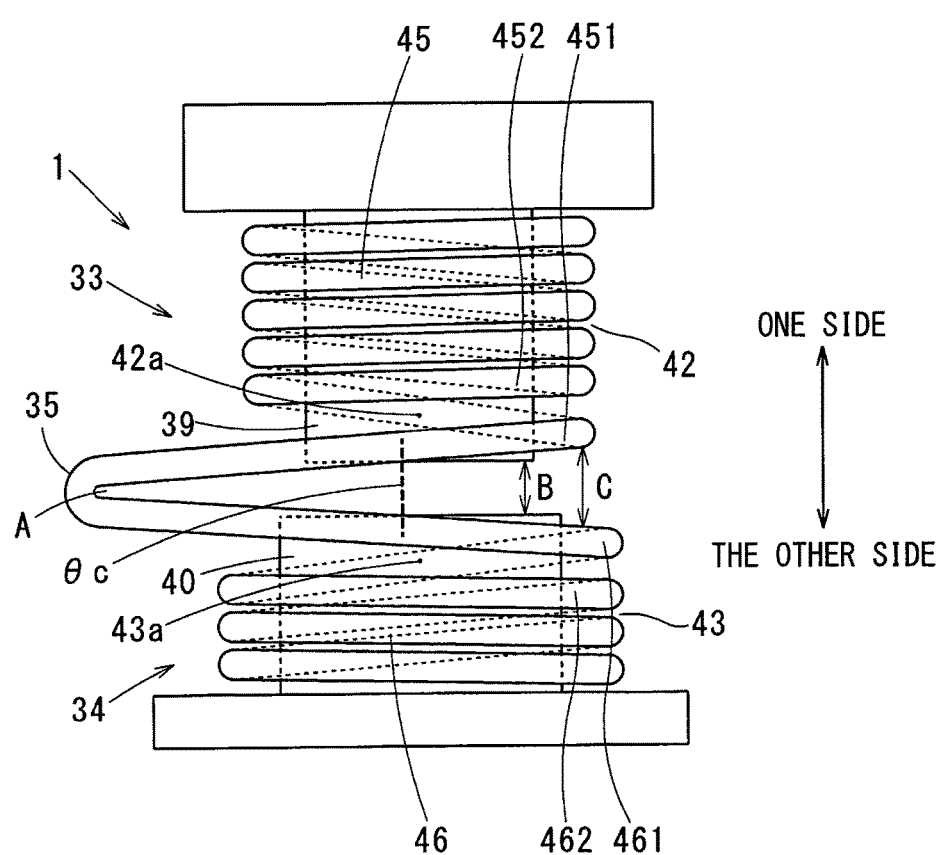
FIG. 14 is a diagram illustrating a torsion spring assembled to one side bush and the other side bush (according to a modification).

Alternatively, the diameter of the other side spring 34 may be set larger than the diameter of the one side spring 33 (refer to FIG. 14).

Figure 15:
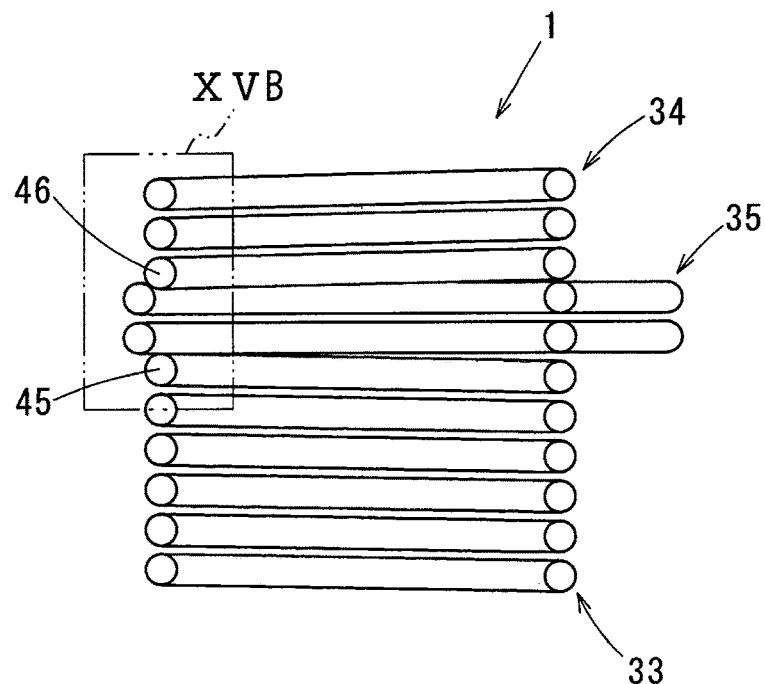
FIG. 15 includes (a) a diagram illustrating a torsion spring in which one turn enters inside of another turn and (b) an enlarged view of an area XVB (according to a reference example).
Figure 15:
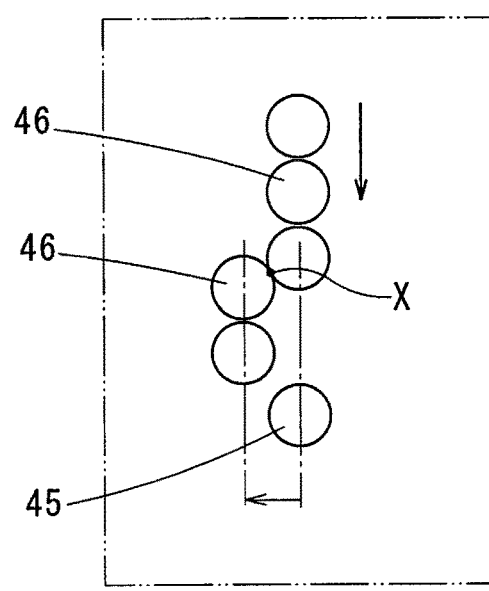

In this case, the clearance in the radial direction relative to the other side bush 40 can be increased in the other side spring 34 where a contact is easily generated between the coil turns. For this reason, even while the orientation of the torsion spring 1 gets worse at the assembling time, a phenomenon (refer to FIG. 15) in which one turn 46 enters inside another turn 46 can be controlled. For this reason, the effect of restricting the contact between the coil turns can be further raised. In FIG. 15, the contact between the coil turns is generated at a location X.

The spring gap C becomes larger than the bush gap B at the predetermined rotation angle θc, and the hook gap A is smaller than the bush gap B in the torsion spring 1 of the second to fifth embodiments. However, the hook gap A, the bush gap B and the spring gap C are not limited to such configuration.

For example, the hook gap A may be set smaller than the bush gap B up to a predetermined position in the midway approaching the other end of the one side spring 33 in the axial direction from the tip end of the middle hook 35 and becomes larger than the bush gap B when passing the predetermined position, and the spring gap C may be set larger than the bush gap B all the circumferences of the turn 451. At this time, the hook gap A may be increased stepwise at a predetermined position.

The number of turns of the one side spring 33 is set to be larger than that of the other side spring 34 according to the torsion spring 1 of the embodiments. However, the number of turns of the other side springs 34 may be larger than that of the one side spring 33 without limiting the number of turns.

The middle hook 35 is assembled to the throttle valve device 2 in the state where the middle hook 35 is bent to the radially outer side or inner side, according to the torsion spring 1 of the embodiments. Alternatively, the torsion spring 1 may be assembled to the throttle valve device 2 without bending the middle hook 35 to the radially outer side or inner side.

Figure 16:
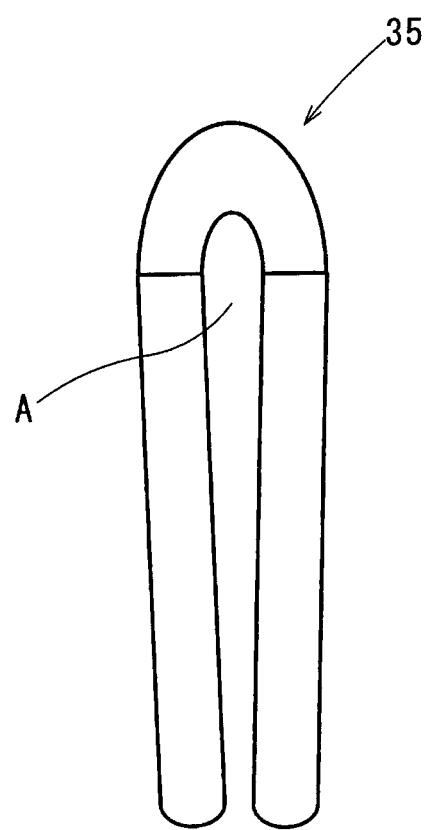
FIG. 16 is a partial enlarged view illustrating a middle hook (according to a modification).

The hook gap A is constant in the torsion spring 1 of the first embodiment, and the hook gap A is gradually increased from the tip end as approaching the other end of the one side spring 33 in the axial direction and the one end of the other side spring 34 in the axial direction, according to the torsion spring 1 of the second embodiment. However, the hook gap A is not limited to such configuration. For example, as shown in FIG. 16, the hook gap A may be gradually decreased as approaching the other end of the one side spring 33 in the axial direction and the one end of the other side spring 34 in the axial direction from the tip end.

The dimension of the turn clearance 42a is larger than the average value of the turn clearances 42 of the one side spring 33, and the dimension of the turn clearance 43a is larger than the average value of the turn clearances 43 of the other side spring 34, according to the torsion spring 1 of the first embodiment. However, the torsion spring 1 is not limited to such configuration.

For example, of the turn clearances 42 of the one side spring 33, the turn clearance 42 located the most other side in the axial direction may be set larger than the other turn clearances 42. Further, of the turn clearances 43 of the other side spring 34, the turn clearance 43 located the most one side in the axial direction may be set larger than the other turn clearances 43. Moreover, the turn clearance 42 located the most other side in the axial direction, of the turn clearances 42 of the one side spring 33, may be set larger than the other turn clearances 42, and the turn clearance 43 located the most one side in the axial direction, of the turn clearances 43 of the other side spring 34, may be set larger than the other turn clearances 43.

Furthermore, the torsion spring 1 is used for the throttle valve device 2 which increases and decreases the opening degree of the intake passage of the internal-combustion engine, in the embodiments. Alternatively, the torsion spring 1 may be used for the throttle valve device 2 which increases and decreases the opening degree of the exhaust passage of the internal-combustion engine. In this case, the exhaust passage includes a flowing-back passage for flowing back exhaust gas to the intake passage.

The invention claimed is:

1. A throttle valve device comprising:
    a torsion spring that is assembled and used in the throttle valve device for increasing and decreasing an opening degree of an intake passage or an exhaust passage of an internal-combustion engine, the torsion spring comprising:
        two coil springs connected with each other so that torsion directions are opposite from each other; and
        a hook disposed between the two coil springs, and
    a valve object housed in the intake passage or the exhaust passage to be rotatable to increase and decrease the opening degree of the intake passage or the exhaust passage, wherein
    of the two coil springs, one side spring arranged at one side in an axial direction biases the valve object to a closing side, and the other side spring arranged at the other side in the axial direction biases the valve object to an opening side,
    at least one coil spring of the two coil springs and the hook connected with each other defines a clearance therebetween, and a dimension of the clearance is larger than an average value of clearances between coil turns of the at least one coil spring,
    the throttle valve device further comprises:
        one side bush arranged at an inner circumference of the one side spring, and having an outer periphery surface in contact with the inner circumference of the one side spring, and
        the other side bush arranged at an inner circumference of the other side spring, and having an outer periphery surface in contact with the inner circumference of the other side spring, wherein a gap is defined between the one side bush and the other side bush in the axial direction,
    a spring gap is defined in the axial direction between a first turn of coil turns of the one side spring located the most other side in the axial direction, and a first turn of coil turns of the other side spring located the most one side in the axial direction, in the state where the torsion spring is assembled to the one side bush and the other side bush,
    the gap defined between the one side bush and the other side bush in the axial direction is defined as a bush gap, and
    the spring gap is smaller than the bush gap, while turning along the first turn toward a second turn in the one side spring, up to a predetermined position in a circumferential direction, and becomes larger than the bush gap when passing the predetermined position.

2. The throttle valve device according to claim 1, wherein a turn number of the one coil spring is smaller than that of the other coil spring.

3. The throttle valve device according to claim 1, wherein an inside diameter of the one coil spring is smaller than that of the other coil spring.

4. The throttle valve device according to claim 1, wherein an inside diameter of the one coil spring is larger than that of the other coil spring.

5. The throttle valve device according to claim 1, wherein in both of the two coil springs, a dimension of a clearance between the respective coil spring and the hook connected with each other is larger than an average value of clearances between coil turns of the respective coil spring.

6. The throttle valve device according to claim 1, wherein the valve object housed in the intake passage of an internal-combustion engine is rotatable to increase and decrease the opening degree of the intake passage, the one side spring has a plurality of turn clearances, the other side spring has a plurality of turn clearances, and a turn clearance located the most one side in the axial direction among the plurality of turn clearances of the other side spring is larger than the other turn clearances.

7. The throttle valve device according to claim 1, wherein the spring gap is increased stepwise at the predetermined position in the circumferential direction.

8. The throttle valve device according to claim 1, wherein the hook is projected to the inner circumference side.

9. A throttle valve device comprising:
a torsion spring that is assembled and used in the throttle valve device for increasing and decreasing an opening degree of an intake passage or an exhaust passage of an internal-combustion engine, the torsion spring comprising:
two coil springs connected with each other so that torsion directions are opposite from each other; and
a hook disposed between the two coil springs, and
a valve object housed in the intake passage or the exhaust passage to be rotatable to increase and decrease the opening degree of the intake passage or the exhaust passage, wherein
of the two coil springs, one side spring arranged at one side in an axial direction biases the valve object to a closing side, and the other side spring arranged at the other side in the axial direction biases the valve object to an opening side,
at least one coil spring of the two coil springs and the hook connected with each other defines a clearance therebetween, and a dimension of the clearance is larger than an average value of clearances between coil turns of the at least one coil spring,
the hook defined by bending a wire element has a hook gap in the axial direction, one end of the hook in the axial direction being connected to the other end of the one side spring in the axial direction, the other end of the hook in the axial direction being connected to the one end of the other side spring in the axial direction, the throttle valve device further comprises:
one side bush arranged at an inner circumference of the one side spring, and having an outer periphery surface in contact with the inner circumference of the one side spring, and
the other side bush arranged at an inner circumference of the other side spring, and having an outer periphery surface in contact with the inner circumference of the other side spring, wherein a gap is defined between the one side bush and the other side bush in the axial direction,
a spring gap is defined in the axial direction between a first turn of coil turns of the one side spring located the most other side in the axial direction, and a first turn of coil turns of the other side spring located the most one side in the axial direction, in the state where the torsion spring is assembled to the one side bush and the other side bush,
the gap defined between the one side bush and the other side bush in the axial direction is defined as a bush gap,
while extending from a tip end of the hook toward the other end of the one side spring in the axial direction, the hook gap is smaller than the bush gap up to a predetermined position, and becomes larger than the bush gap when passing the predetermined position, and
the spring gap is larger than the bush gap.

10. The throttle valve device according to claim 9, wherein
the hook gap is increased stepwise at the predetermined position.

11. The throttle valve device according to claim 1, wherein
the valve object housed in the intake passage of the internal-combustion engine is rotatable to increase and decrease the opening degree of the intake passage,
the one side spring has a plurality of turn clearances,
the other side spring has a plurality of turn clearances, and
a turn clearance located the most other side in the axial direction among the plurality of turn clearances of the one side spring is larger than the other turn clearances.

12. The throttle valve device according to claim 11, wherein
a turn clearance located the most one side in the axial direction among the plurality of turn clearances of the other side spring is larger than the other turn clearances.

13. The throttle valve device according to claim 9, wherein
the valve object housed in the intake passage of the internal-combustion engine is rotatable to increase and decrease an opening degree of the intake passage,
the one side spring has a plurality of turn clearances,
the other side spring has a plurality of turn clearances, and
a turn clearance located the most other side in the axial direction among the plurality of turn clearances of the one side spring is larger than the other turn clearances.

14. The throttle valve device according to claim 9, wherein
the valve object housed in the intake passage of an internal-combustion engine is rotatable to increase and decrease an opening degree of the intake passage,
the one side spring has a plurality of turn clearances,
the other side spring has a plurality of turn clearances, and
a turn clearance located the most one side in the axial direction among the plurality of turn clearances of the other side spring is larger than the other turn clearances.

15. The throttle valve device according to claim 13, wherein
a turn clearance located the most one side in the axial direction among the plurality of turn clearances of the other side spring is larger than the other turn clearances.

* * * * *